United States Patent [19]
Streubel et al.

[11] Patent Number: 6,059,314
[45] Date of Patent: May 9, 2000

[54] METHOD OF MANUFACTURING A COMPOSITE CONTROL ARM SHAFT FOR MOTOR VEHICLES AND COMPOSITE CONTROL ARM SHAFT

[75] Inventors: Wolfgang Streubel, Dotmold; Udo Klasfauseweh, Gütersloh; Klaus Gläser, Salzkotten, all of Germany

[73] Assignee: Benteler AG, Paderborn, Germany

[21] Appl. No.: 08/974,037

[22] Filed: Nov. 19, 1997

[30] Foreign Application Priority Data

Nov. 27, 1996 [DE] Germany ............................ 196 49 076

[51] Int. Cl.⁷ ............................ B62D 21/00; B62D 21/03; B60G 3/12; B60G 3/18
[52] U.S. Cl. .................... 280/798; 280/796; 280/124.153
[58] Field of Search ........................ 280/124.11, 124.116, 280/124.128, 124.133, 124.153; 180/905; 403/270, 271, 272; 29/897.2, 421.1

[56] References Cited

U.S. PATENT DOCUMENTS

| | | | |
|---|---|---|---|
| 1,928,942 | 10/1933 | Maddock | 280/794 |
| 2,194,349 | 3/1940 | Almdale | 280/796 |
| 4,232,881 | 11/1980 | Kolbel et al. | 280/721 |
| 4,486,030 | 12/1984 | Takata et al. | 280/124.128 |
| 4,700,796 | 10/1987 | Morlok et al. | 180/905 |
| 4,982,978 | 1/1991 | Kawasaki | 280/675 |
| 5,005,856 | 4/1991 | Shibahata | 280/688 |
| 5,215,329 | 6/1993 | Santo | 280/124.128 |
| 5,324,073 | 6/1994 | Alatalo et al. | 280/124.128 |
| 5,641,176 | 6/1997 | Alatalo | 280/124.128 |

FOREIGN PATENT DOCUMENTS 0262474 10/1990 Japan .................................... 280/796

Primary Examiner—Brian L. Johnson
Assistant Examiner—Michael Britton
Attorney, Agent, or Firm—Friedrich Kueffner

[57] ABSTRACT

A method of manufacturing a composite front suspension control arm shaft for motor vehicles includes connecting two tubular longitudinal control arms to a transverse sectional member, wherein a connection portion adapted to the cross-sectional configuration of the ends of the transverse sectional member is produced at each longitudinal control arm, and wherein the ends of the transverse sectional member are positioned in an assembly position relative to the connection portions and are secured by welding thereto. The composite front suspension control arm shaft includes two tubular longitudinal control arms connected to a transverse sectional member, wherein the first length portion of each longitudinal control arm adjacent the wheel carrier is of rectangular configuration, wherein the width of the rectangular length portion is greater than the height of the length portion and a second length portion of each longitudinal control arm to be coupled to the support frame is of rectangular configuration, wherein the height of the second rectangular length portion is greater than its width, and wherein each longitudinal control arm has a connection portion adapted to the cross-sectional configuration of the ends of the transverse sectional member.

2 Claims, 3 Drawing Sheets

METHOD OF MANUFACTURING A COMPOSITE CONTROL ARM SHAFT FOR MOTOR VEHICLES AND COMPOSITE CONTROL ARM SHAFT

BACKGROUND OF THE INVENTION

1. Field of the Invention

The present invention relates to a method of manufacturing a composite front suspension control arm shaft for motor vehicles and to a composite front suspension control arm shaft.

2. Description of the Related Art

For increasing the productivity of automobile manufacture, there is a general desire for the manufacture of motor vehicle components which is as economical and efficient as possible, while simultaneously increasing the quality of the products. These demands are also made of composite front suspension control arm shafts, wherein the advantages of a simple construction are to be combined with a low weight per volume and good kinematic properties.

SUMMARY OF TEE INVENTION

Therefore, it is the primary object of the present invention to provide a more economical and more efficient method of manufacturing a composite front suspension control arm shaft while improving the automation of the production thereof. In addition, it is another object of the present invention to provide a high quality, yet inexpensive, composite front suspension control arm shaft.

In accordance with the present invention, two tubular longitudinal control arms are connected to a transverse sectional member, wherein a connection portion adapted to the cross-sectional configuration of the ends of the transverse sectional member is produced at each longitudinal control arm, and wherein the ends of the transverse sectional member are positioned in an assembly position relative to the connection portions and are secured by welding thereto.

The composite front suspension control arm shaft according to the present invention includes two tubular longitudinal control arms connected to a transverse sectional member, wherein the length portion of each longitudinal control arm adjacent the wheel carrier is of rectangular configuration, wherein the width of the rectangular length portion is greater than the height of the length portion and a second length portion of each longitudinal control arm to be coupled to the support frame is of rectangular configuration, wherein the height of the second rectangular length portion is greater than its width, and wherein each longitudinal control arm has a connection portion adapted to the cross-sectional configuration of the ends of the transverse sectional member.

Accordingly, the basic concept of the present invention is the fact that each longitudinal control arm is provided with a connection portion which is adapted to the cross-sectional configuration of the ends of the transverse sectional member. The ends of the transverse sectional member can be positioned correctly for assembly and can subsequently be connected by welding.

The measures according to the present invention significantly simplify the processing of the ends of a transverse sectional member as well as the welding of the transverse sectional member to the longitudinal control arms. This results in an increase of the productivity.

A straight sawing cut is sufficient as the processing of the ends of the transverse sectional member. Complicated and especially three-dimensional cuts at the ends or complicated processing are not required. Consequently, material is also saved.

All conventional welding methods, such as laser welding, shielded arc welding, friction welding or resistance welding, can be used for connecting the transverse sectional member with the longitudinal control arms.

The connection portion provided at each longitudinal control arm facilitates a reliable and precise positioning of the transverse sectional member for preparation of the welding process. The connection portion provides in the spatially curved longitudinal control arms a correctly configured contact surface for the ends of the transverse sectional member. Consequently, a high degree of automation is possible. Moreover, depending on the configuration, the connection portion can also carry out a support function and, thus, increase the stability of a composite control arm shaft.

The present invention generally makes it possible to carry out a more economical manufacture of a composite control arm shaft while simultaneously saving material, energy, labor and time.

In accordance with a feature of the present invention, the connection portion is formed by an increased thickness portion of the longitudinal control arm with a planar contact surface for the end of a transverse sectional member. In accordance with this feature, the circumference of a longitudinal control arm is increased in the connection portion for the transverse sectional member preferably by hydraulic shaping or by tensile deformation or compressive/tensile deformation and the longitudinal control arm is adapted in this manner to the cross-sectional configuration of the ends of the transverse sectional member.

However, other configurations of the connection portion are basically also possible. For example, a configuration with a receiving bead directed toward the interior of the longitudinal control arm or a cup-shaped receiving portion are also conceivable.

In accordance with another feature of the present invention, the end of a transverse sectional member is placed against the planar contact surface in the connection portion and is welded thereto. This produces an advantageously simple connection of the transverse sectional member to the longitudinal control arms which can be subjected to high loads.

This feature also makes possible a connection which is particularly good with respect to welding technology and can be carried out fully automatically by means of welding robots. Complicated welding seams are not required. The reliability and the service life of the connection are increased.

In accordance with another feature it is also possible to provide the longitudinal control arm in the connection portion thereof with a hole, so that an assembly opening for the end of a transverse sectional member is created. The end of the transverse sectional member can then be inserted into the opening of the longitudinal control arm and can be welded at its circumference to the wall of the longitudinal control arm. Processing of the ends of the transverse sectional member is not required.

In accordance with a particularly advantageous feature with respect to manufacture and construction of the connection portion and with respect to a stable welded connection of longitudinal control arm and transverse sectional member, circular or oval geometries are used in the connection portion. Accordingly, it is provided in accordance with the present invention that the ends of the transverse sectional member are circular or oval.

The connection portion shaped in accordance with the present invention is easily accessible, so that automatic welding processes can operate precisely and quickly.

In accordance with another feature of the present invention, the connection portion is produced by means of a hydraulic high internal pressure.

By shaping the longitudinal control arm by means of the hydraulic internal high pressure method, an economical manufacture at high production numbers and low finishing tolerances is possible.

The hydraulic shaping tool has a simple geometric configuration. This has a positive effect on the welding behavior of the tool. Moreover, disadvantageous material changes during the deformation process are avoided.

The transverse sectional member may have in its middle portion a profile which deviates from the circular or oval cross-section in order to serve its purpose as a torsion rod between the longitudinal control arms in an optimum manner. The transverse sectional member changes toward its ends continuously into a circular or oval tubular cross-section.

The transverse sectional member is advantageously manufactured of a tube which is deformed into, for example, a V-shape, U-shape, T-shape or X-shape. For connecting the transverse sectional member to the longitudinal control arms, the ends of the transverse sectional member are round or oval.

The composite front suspension control arm shaft for motor vehicles according to the present invention is of high quality and is very inexpensive. The particular feature of the composite control arm shaft is the special cross-sectional configuration of the longitudinal control arms and the connection to the transverse sectional member.

The geometric configuration according to the present invention makes it possible to achieve in the length portion of a longitudinal control arm to be coupled to the support frame and in the length portion of the longitudinal control arm adjacent the wheel support a section modulus which is adjusted to the loads occurring during operation. The connection of the transverse sectional member which takes into account the correct loads makes it possible to introduce the torsion forces and bending forces from the longitudinal control arms into the transverse sectional member. The transverse sectional member as a torsion rod compensates the forces which are introduced into it. Consequently, the composite control arm shaft has a good static and dynamic load behavior.

A further improvement of the elastokinetic behavior of a composite control arm shaft is achieved in accordance with the present invention by a transverse sectional member which is provided in its middle portion with an essentially V-shaped cross-section. This V-shaped cross-section changes continuously toward the ends of the transverse sectional member into a circular tubular cross-section.

The composite control arm shaft according to the present invention may be manufactured of steel or also of aluminum or of a mixed construction of both metals. The longitudinal control arms are made of tubular sections. Seamless pipes or pipes with longitudinal welding seams may be used as well as continuous compression cast sections.

The longitudinal control arms may also be made of pressed shells which are joined together. This type of construction uses an inner pressed shell and an outer pressed shell, wherein the connection portion is provided at the inner pressed shell.

The transverse sectional members are preferably made of pipes or continuous compression cast sections whose geometry is adapted to the torsional and bending loads occurring during operation.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DESCRIPTION OF THE PREFERRED EMBODIMENTS

Figure 1:
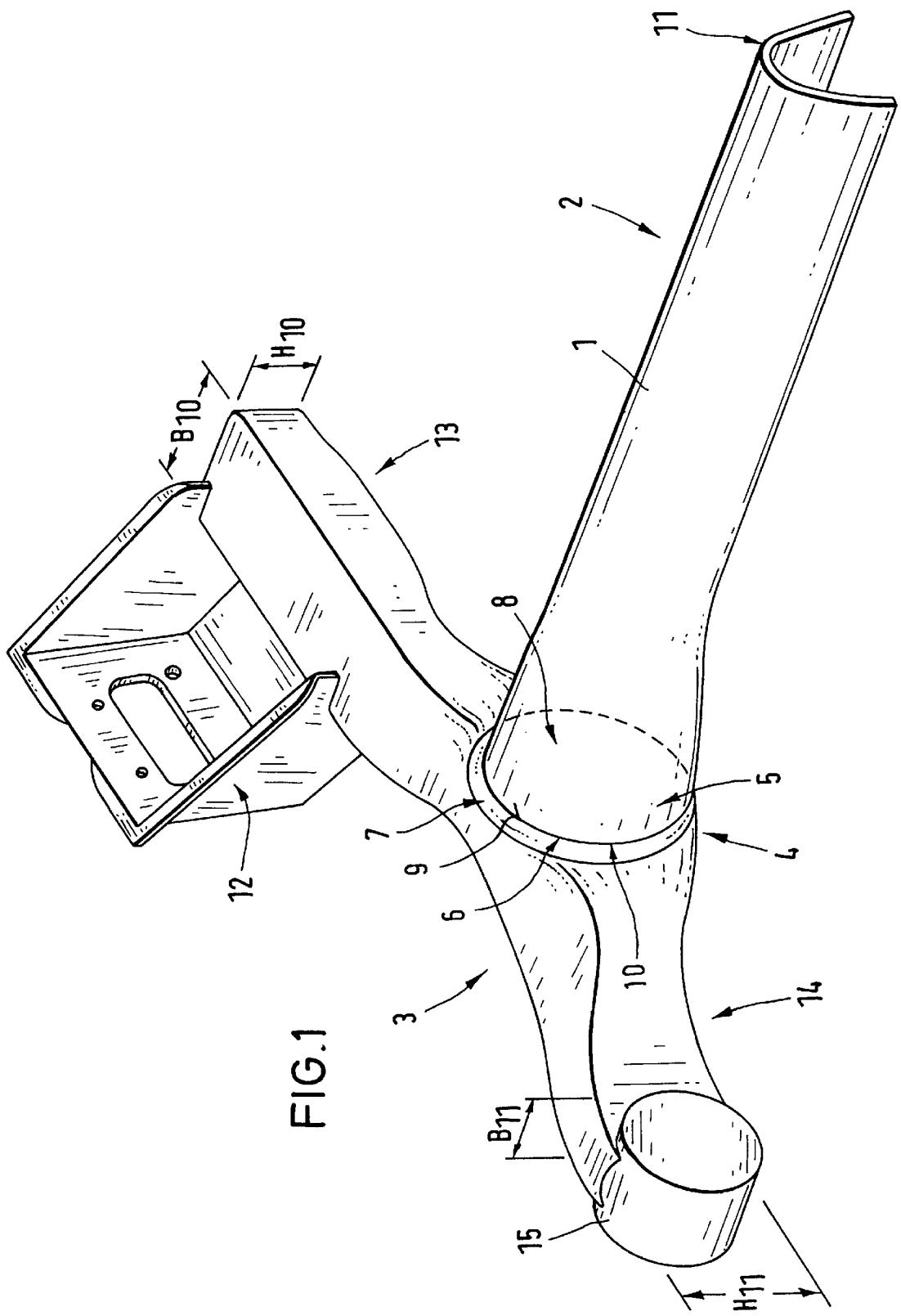
FIG. 1 is a perspective partial illustration of a composite front suspension control arm shaft according to the present invention.

FIG. 1 of the drawing is a partial illustration of a composite front suspension control arm shaft for a motor vehicle showing the end portion 1 of a transverse sectional member 2 and a longitudinal control arm 3.

The longitudinal control arm 3 is shaped or formed by means of hydraulic internal high pressure. In the connection portion 4 of the longitudinal control arm 3 and the transverse sectional member 2, the circumference of the longitudinal control arm 3 is intentionally increased and a contact surface 6 is formed which is adapted to the cross-sectional configuration of the end 5 of the transverse sectional member 2.

The connection portion 4 is formed by an increased thickness portion 7 with an only schematically illustrated planar end face 8 shaped so as to conform to the end 5 of the transverse sectional member 2. In this manner, the planar contact surface 6 is formed for a circular connection of the end 5 to the longitudinal control arm 3. The end 5 of the transverse sectional member 2 rests with its end face 9 in the manner of a butt-joint against the contact area 8. Subsequently, the welding connection can be produced along the circumferential edge 10.

This type of procedure can be advantageously included in the manufacturing process and can be easily automated.

The transverse sectional member 2 is constructed in its middle portion 11 with a double wall and an essentially V-shaped profile. The V-shaped profile is produced by shaping a pipe. Toward the end 5 of the transverse sectional member 2, the cross-section changes continuously into a circular tubular cross-section. Consequently, the end 5 is adapted to be connected to the longitudinal control arm 3.

Since the torsional forces and bending forces are transmitted from the longitudinal control arm 3 into the transverse sectional member 2 and are compensated by the latter, the connection between the two structural components is subjected to the highest loads. The composite control arm shaft according to the present invention is capable of absorbing these loads. In this regard, the structural configuration of the connection portion with the circular connection of transverse sectional member 2 and longitudinal control arm 3 and the circumferential welding seam have a positive effect.

Moreover, FIG. 1 further shows that a length portion 13 of the longitudinal control arm 3 coupled to the wheel carrier 12 has a rectangular configuration with a width $B_{10}$ which is greater as compared to its height $H_{10}$. The length portion 14 adjacent the support frame also has a rectangular configuration. However, in this case, the height $H_{11}$ is greater as compared to the width $B_{11}$.

In this manner, the section modulus in each length portion 13 and 14 is adjusted to the static and dynamic loads occurring during operation.

A connection component 15 is provided for attaching the composite control arm shaft to the support frame of the motor vehicle.

Figure 2:
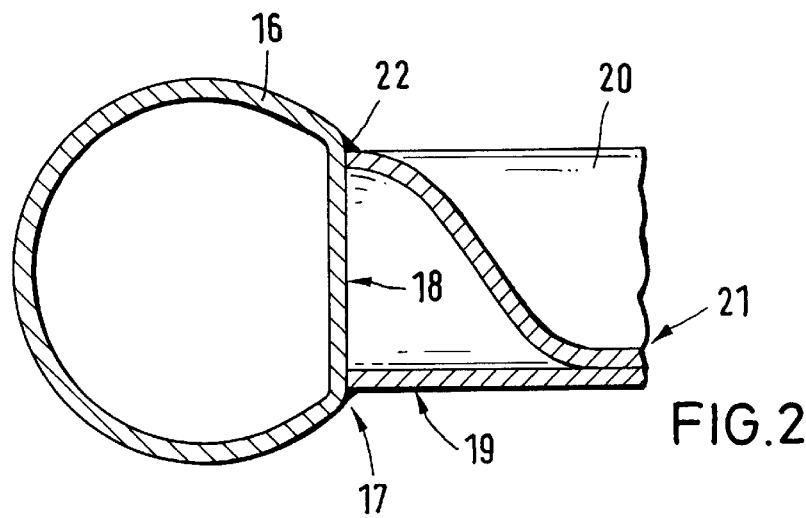
FIGS. 2–4 are vertical cross-sectional views showing three embodiments of the connection between longitudinal control arm and transverse sectional member.

In the embodiment illustrated in FIG. 2, a connection portion 17 is formed in the longitudinal control arm 16 by hydraulic shaping. The connection portion 17 has a planar contact surface 18 for the end 19 of a transverse sectional member 20.

The end 19 of the transverse sectional member 20 is circular, while the middle portion 21, not shown in detail, deviates from the circular shape and may have a V-shape, T-shape, or X-shape.

The end 19 placed against the planar contact surface 18 is joined to the contact surface 18 by means of a circular planar welding seam 22.

Figure 3:
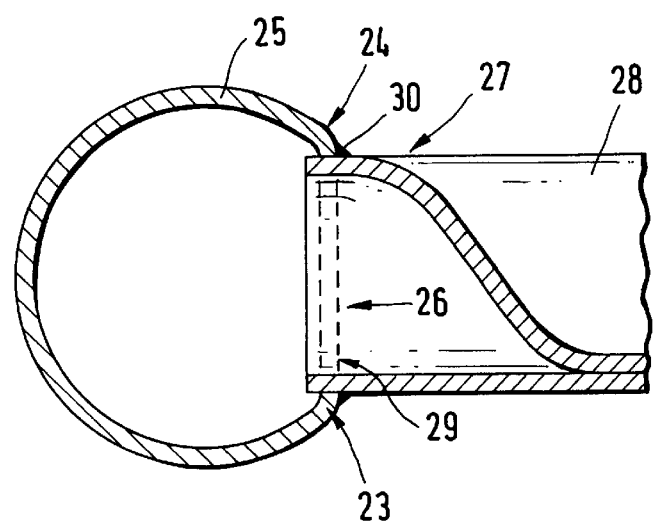

Another embodiment is shown in FIG. 3. In this case, an assembly opening 26 is provided in the wall 23 of the connection portion 24 produced by a hydraulic internal high pressure method. The assembly opening 26 is produced by making a hole in the end face 29 of the connection portion 24 facing the end 27 of the transverse sectional member 28.

The end 27 of the transverse sectional member 28 is inserted into the assembly opening 26 and is welded circumferentially by a planar welding seam 30. Further processing of the end 27 is not required.

Figure 4:
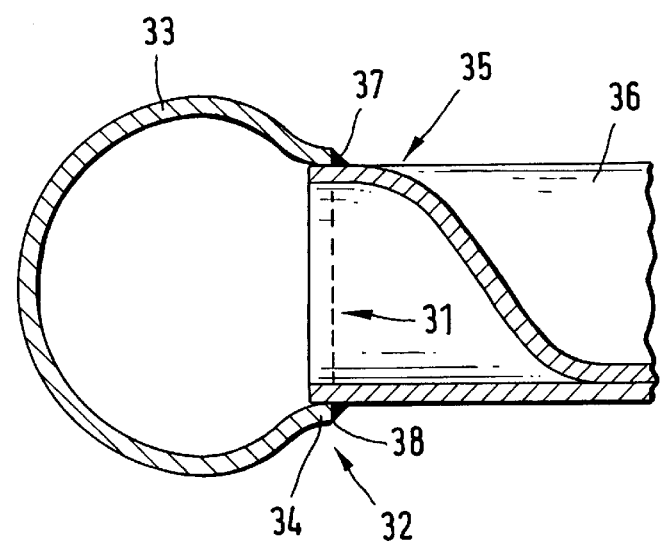
Figure 5:
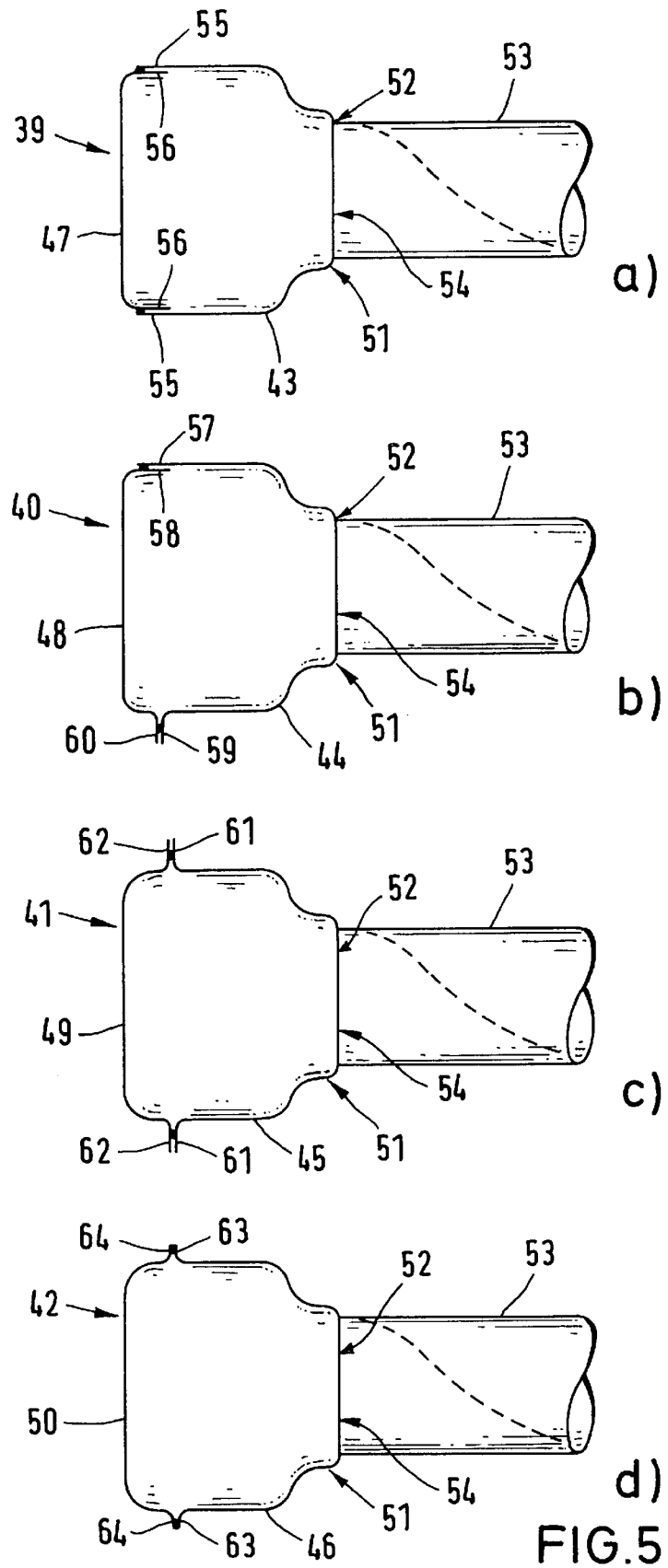
FIGS. 5a to 5d are schematical illustrations showing four different embodiments of a longitudinal control arm made of pressed shells showing the connection portion and the transverse sectional member.

An assembly opening 31 in the connection portion 32 of the longitudinal control arm 33 is also provided in the embodiment shown in FIG. 4. An outwardly projecting circumferential collar 34 is provided at the circumference of the assembly opening 31.

The transverse sectional member 36 is inserted with its end 35 into the assembly opening 31 and is welded with a circumferentially extending welding seam. The welding seam 37 is located at the end face 38 of the collar 34. The collar 34 surrounds the end 35 of the transverse sectional member 36 in a positively engaging manner. This makes possible a particularly good connection by welding, wherein the connection is reliable and has a long service life.

FIG. 5a to 5d show vertical cross-sectional views of four different embodiments of longitudinal control arms 39 to 42.

Each longitudinal control arm 39 to 42 is composed of an inner pressed shell 43 to 46 and an outer pressed shell 47 to 50. A connection portion 51 with a planar contact surface 52 for a transverse sectional member 53 is bent outwardly from the inner pressed shell 43–46.

The transverse sectional member 53 is placed with its end face 54 in the manner of a butt-joint against the contact surface 52 and is welded thereto.

The longitudinal control arms 39–42 differ from each other with respect to the type of flange configuration through which the inner pressed shells 43–46 are welded to the outer pressed shells 47–50.

In the longitudinal control arm 39, the flanges 55, 56 or the inner and outer pressed shells 43 and 47, respectively, are constructed so as to overlap.

The flanges 57, 58 in the longitudinal control arm 40 overlap each other on the upper side, while the flanges 59, 60 on the bottom side are constructed as spot flanges.

The flanges 61, 62 of the longitudinal control arm 41 are constructed as spot flanges on both sides.

In the longitudinal control arm 42, the flanges 63, 64, are constructed as so-called short $CO_2$ flanges.

While specific embodiments of the invention have been shown and described in detail to illustrate the inventive principles, it will be understood that the invention may be embodied otherwise without departing from such principles.

We claim:

1. A composite front suspension control arm shaft for motor vehicles, the control arm shaft comprising two tubular longitudinal control arms connected through a transverse sectional member, each longitudinal control arm having a first length portion adjacent a wheel carrier and a second length portion to be coupled to a support frame, each length portion having a height and a width, wherein the width of the first length portion is greater than the height of the first length portion and the height of the second length portion is greater than the width of the second length portion, wherein each longitudinal control arm comprises between the first and second length portions a connection portion having an increased diameter and a planar contact surface adjusted to conform to a cross-sectional configuration of an end of the transverse sectional member wherein the transverse sectional member has an essentially V-shaped cross-section, and wherein the V-shaped cross-section changes continuously toward the ends of the transverse sectional member into one of a circular and an oval tubular cross-section.

2. The composite control arm shaft according to claim 1, wherein the transverse sectional member is an essentially V-shaped section, and wherein the ends of the transverse sectional member have at least approximately circular cross-sections.

\* \* \* \* \*